UNITED STATES PATENT OFFICE.

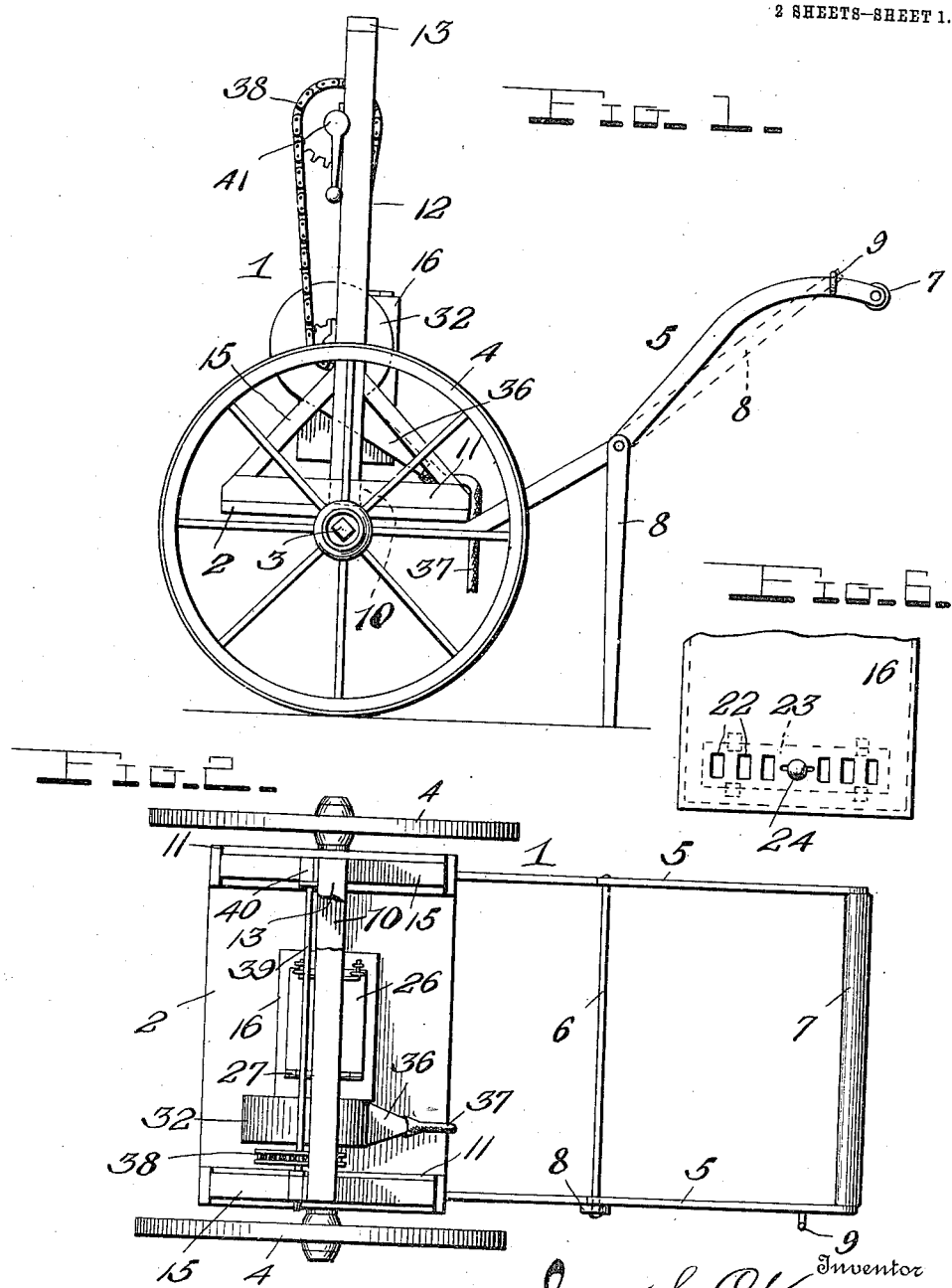

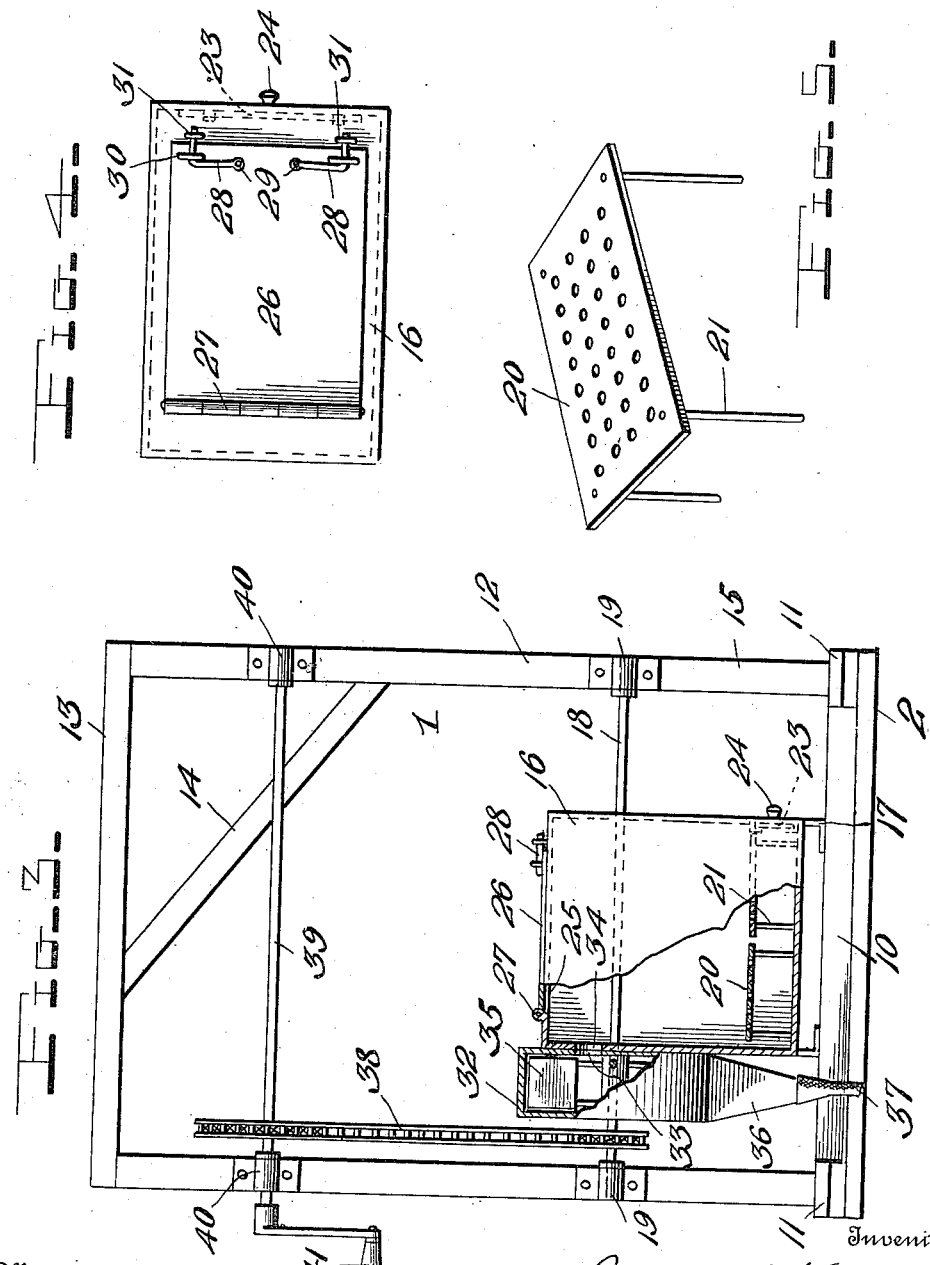

JOSEPH CHARLES KEMBALL, OF ARDEN, WASHINGTON.

FUMIGATOR.

976,266.  Specification of Letters Patent.  Patented Nov. 22, 1910.

Application filed November 3, 1909. Serial No. 526,119.

*To all whom it may concern:*

Be it known that I, JOSEPH CHARLES KEMBALL, a citizen of the United States, residing at Arden, in the county of Stevens and State of Washington, have invented certain new and useful Improvements in Fumigators, of which the following is a specification, reference being had to the accompanying drawings.

My invention relates to improvements in fumigating, more particularly one adapted for generating and forcing noxious fumes through the burrows of animals such as squirrels, chipmunks, gophers etc., for the purpose of destroying animal life.

The object of the invention is to provide a simple and inexpensive machine of this character which may be readily transported, and which will be strong and durable in construction and effective in operation.

With the above and other objects in view, the invention consists of the novel construction, combination and arrangement of parts hereinafter fully described and claimed, and illustrated in the accompanying drawings in which—

Figure 1 is a side elevation of my improved fumigator; Fig. 2 is a top plan view; Fig. 3 is a rear elevation with parts in section and with portions of the carriage omitted. Fig. 4 is a plan view of the fire box or heater; Fig. 5 is a perspective view of one of the sections of the false bottom of the heater, and Fig. 6 is a detail view showing the damper of the heater.

My invention comprises an upright frame 1 mounted on a carriage so that it may be readily transported, such carriage consisting of a rectangular body or platform 2 fixed to an axle 3 carrying supporting wheels 4. Handle bars 5 project from the platform 2 adjacent its ends and are united by a cross rod 6, and a hand grip bar 7. To permit the platform to be maintained in a horizontal position, I may provide a supporting leg 8 which is pivoted on a projecting end of the rod 6, and when not in use it may be swung up into a substantial parallel relation with respect to the adjacent handle bar 5 and supported thereon by engaging it with a retaining hook 9.

The frame 1 is arranged on top of the carriage platform 2 and consists of a longitudinal base bar 10 united at its ends to two transverse base bars 11, from which latter rise uprights 12. These uprights are connected at their upper ends by a top longitudinal bar 13 and the upper end of one of them is connected by a diagonal brace 14 to said bar 13. The lower portions of the uprights 12 are supported by diagonal braces 15 which are secured to the ends of the bars 11.

16 denotes a fire box or heater within which the noxious fumes are generated, such heater consisting of a rectangular box of sufficient size to receive a quantity of dried leaves, twigs, wood or other substances which when burned will produce a dense smoke, and upon which may be thrown sulfur to produce the noxious fumes. The fire box 16 is supported within the frame 1 by providing upon its bottom angular feet 17 which is secured to the bar 10, and by passing through its upper portion a longitudinal shaft 18 which is journaled in a bearing 19 on the uprights 1.

The fuel to be burned is supported on a false bottom consisting of one or more perforated or foraminous plates 20 provided with depending supporting legs 21 which are of such length as to dispose the plates or sections 20 above air inlet openings 22 formed in one side wall of the box 16. These air inlet or draft openings 22 are adapted to be controlled by a slidable damper 23 having a handle 24. The top of the fire box 16 is formed with an opening 25 through which the fuel is passed, and which is adapted to be closed by a cover 26 which is hingedly mounted at 27. A pair of hook-shaped fastenings 28 are pivoted at 29 on the cover and are adapted to have their free ends passed through eyes 30, 31, on the cover 26 and the stationary portion of the top of the box, as clearly shown in Figs. 3 and 4.

The smoke or fumes generated in the fire box or heater pass from the same into a fan casing 32, through registering openings 33 formed in the upper portion of the fire box and the central portion of the fan casing as shown in Fig. 3. The fan casing 32 is of cylindrical shape and is arranged concentric with the shaft 18, to which latter is fixed the hub 33 of a rotary fan. While the latter may be of any form and construction, it preferably consists of four blades 35 united to radial arms projecting from the hub 33. The casing 32 is formed with a downwardly inclined and tapering discharge spout 36, to which latter is attached a flexible tube or hose 37 for conducting the smoke or fumes into the burrows of the animals to be destroyed.

The shaft 18 is connected by sprocket chain gearing 38 to a longitudinally arranged drive shaft 39 journaled in bearings 40 on the uprights 12 and having at one of its ends a crank handle 41.

In using the machine the discharge tube 37 is inserted in one of the outlets of the burrow to be fumigated and all of the other outlets are stopped up. Dried leaves, brush or other material which will produce a dense smoke is then deposited on the false bottom sections 20, and this fuel is then sprinkled with sulfur or any other substance which will produce noxious fumes, and ignited. The crank handle 41 is then rotated to cause the fan to suck the smoke or fumes from the fire box through the opening 33, and then from the fan casing through the spout 36 and tube or hose 37. The machine is thus operated until sufficient smoke has been forced into the burrow to kill the animals therein, and the tube 37 is then removed from the outlet and the latter is closed. The machine may then be moved to the next burrow to be fumigated, or it may be connected to another outlet of the same burrow.

Having thus described the invention what is claimed is:

A machine of the character described comprising a carriage, an upright frame thereon consisting of upper and lower bars united by uprights, a fire box having a bottom, attaching feet secured to said lower bar, a longitudinal shaft journaled in bearings on said uprights and extending through the fire box to support the upper portion of the same, said fire box being formed with a covered fuel inlet at its top, damper-controlled air inlets adjacent its bottom and a fume outlet adjacent its top, a foraminous false bottom in said fire box, a fan casing concentric with said shaft and having a centrally located inlet registering with said smoke outlet of the fire box, said fan casing having a tapered discharge spout, a flexible tube extending from said spout, a fan fixed to said shaft and arranged within the fan casing, and means for rotating said shaft.

In testimony whereof I hereunto affix my signature in the presence of two witnesses.

JOSEPH CHARLES KEMBALL.

Witnesses:
HARRY DREWEATT,
ANNIE KEMBALL.